United States Patent
Bittner et al.

(10) Patent No.: US 12,426,526 B2
(45) Date of Patent: Sep. 30, 2025

(54) SYSTEMS AND METHODS FOR CONTROLLING A STEER ANGLE AND STEER ANGLE STATE OF A MITIGATION STEERING CONTROLLER FOR AN AGRICULTURAL WORK VEHICLE

(71) Applicant: CNH Industrial America LLC, New Holland, PA (US)

(72) Inventors: Roy A. Bittner, Reedsville, WI (US); Mitchell Sandey, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 200 days.

(21) Appl. No.: 18/205,896

(22) Filed: Jun. 5, 2023

(65) Prior Publication Data
US 2024/0397848 A1 Dec. 5, 2024

(51) Int. Cl.
A01B 69/00 (2006.01)
A01B 69/04 (2006.01)

(52) U.S. Cl.
CPC .......... *A01B 69/008* (2013.01); *A01B 69/007* (2013.01)

(58) Field of Classification Search
CPC .............................. A01B 69/007; A01B 69/008
USPC ....................................................... 701/41, 42
See application file for complete search history.

(56) References Cited

U.S. PATENT DOCUMENTS

| 3,952,828 A * | 4/1976 | Stampfer | A01B 69/008 180/401 |
| 3,991,618 A | 11/1976 | Stampfer et al. | |
| 4,126,984 A | 11/1978 | Gail | |
| 5,255,756 A | 10/1993 | Follmer et al. | |
| 7,716,905 B2 | 5/2010 | Wilcox et al. | |
| 10,104,827 B2 | 10/2018 | Adamchuk et al. | |
| 10,528,048 B2 * | 1/2020 | Cavender-Bares | G05D 1/0231 |
| 10,531,603 B2 | 1/2020 | Ferrari et al. | |
| 10,795,372 B2 | 10/2020 | Runde et al. | |
| 11,224,154 B2 | 1/2022 | Dix | |

(Continued)

FOREIGN PATENT DOCUMENTS

| DE | 19625010 A1 | 1/1998 |
| EP | 0136545 B1 | 1/1988 |

OTHER PUBLICATIONS

Pantazi et al., Chapter 1: Sensors in Agriculture, Intelligent Data Mining and Fusion Systems in Agriculture, 2020, 1-15. https://doi.org/10.1016/B978-0-12-814391-9.00001-7 https://scihub.hkvisa.net/10.1016/B978-0-12-814391-9.00001-7.

*Primary Examiner* — Erick R Solis
(74) *Attorney, Agent, or Firm* — Dority & Manning, P.A.

(57) ABSTRACT

In one aspect, the present subject matter is directed to a system which includes a row crop mitigation system configured to mitigate damage to a row crop by changing a steer angle of a ground engaging element of an agricultural work vehicle. The row crop mitigation system includes a crop row sensor configured to generate crop plant data, as well as a mitigation steering controller configured to selectively change the steer angle of the ground engaging element of the agricultural work vehicle. The mitigation steering controller having an inactive state in which the mitigation steering controller does not change a steer angle of the ground engaging element, and an active state in which the mitigation steering controller is configured to generate a mitigation steer angle command to change the steer angle of the ground engaging element.

13 Claims, 11 Drawing Sheets

(56) References Cited

U.S. PATENT DOCUMENTS

| | | | |
|---|---|---|---|
| 11,284,556 B2 | 3/2022 | Schleicher et al. | |
| 2010/0017075 A1* | 1/2010 | Beaujot | A01B 69/008 |
| | | | 701/50 |
| 2011/0118926 A1* | 5/2011 | Peake | G05D 1/0227 |
| | | | 701/25 |
| 2015/0334920 A1* | 11/2015 | Schleicher | A01B 69/008 |
| | | | 701/33.9 |
| 2017/0122742 A1* | 5/2017 | Schleicher | G01C 21/14 |
| 2019/0126308 A1* | 5/2019 | Hendrickson | B05B 1/20 |
| 2021/0132618 A1 | 5/2021 | Van Roekel et al. | |
| 2022/0066453 A1 | 3/2022 | Sneyders et al. | |
| 2022/0187832 A1 | 6/2022 | Weidenbach et al. | |
| 2023/0060628 A1* | 3/2023 | Schleicher | A01D 41/127 |
| 2024/0040946 A1* | 2/2024 | Katti | A01D 41/1278 |
| 2024/0074341 A1* | 3/2024 | Masih | G05D 1/0278 |
| 2024/0365695 A1* | 11/2024 | Hennig | B60B 35/1054 |

* cited by examiner

SYSTEMS AND METHODS FOR CONTROLLING A STEER ANGLE AND STEER ANGLE STATE OF A MITIGATION STEERING CONTROLLER FOR AN AGRICULTURAL WORK VEHICLE

FIELD OF THE INVENTION

The present disclosure relates generally to agricultural work vehicles such as sprayers and, more particularly, to systems and methods controlling a steer angle and steer angle state when operating the work vehicle.

BACKGROUND OF THE INVENTION

Agricultural work vehicles, such as sprayers, often have a need to traverse a planted field along rows of growing crop plants (e.g., growing corn or soy bean) to conduct an associated operation. Maintaining a track along the rows is important to avoid damaging the growing crop plants and reducing total yield. Automated systems can be used to track one or more wheels, or other ground engaging elements, of the work vehicle along the row to reduce the likelihood of damaging the growing crops. As the work vehicle approaches the end of a row and enters the turn row, or headland, of a field, maintaining the track of the wheel is no longer important, and in some cases detrimental, such as when sharp turning is required, as the work vehicle is transitioning out of an automatic row following mode and to a default mode of operation.

Accordingly, systems and methods for updating calibration values that address one or more of the issues present in the prior art would be welcomed in the technology, including, for example, systems and methods that provide a reliable transition (e.g., including less resource intensive) and/or provide for promptly transitioning to a default mode of operation of the work vehicle.

SUMMARY OF THE INVENTION

Aspects and advantages of the technology will be set forth in part in the following description, or may be obvious from the description, or may be learned through practice of the technology.

In one aspect, the present subject matter is directed to a system for steering agricultural work vehicles. The system includes a row crop mitigation system configured to mitigate damage to a row crop by changing a steer angle of a ground engaging element of an agricultural work vehicle. The row crop mitigation system includes a crop row sensor configured to generate crop plant data indicative of a location of each crop plant of a plurality of crop plants as well as a mitigation steering controller configured to selectively change the steer angle of the ground engaging element of the agricultural work vehicle. The mitigation steering controller can include an inactive state in which the mitigation steering controller does not change a steer angle of the ground engaging element and an active state in which the mitigation steering controller is configured to generate a mitigation steer angle command to change the steer angle of the ground engaging element. The inactive state is determined based on an evaluation of the crop plant data indicating that the ground engaging element is not in proximity to a row of crops. The active state is determined based on an evaluation of the crop plant data indicating that the ground engaging element is in proximity to the row of crops.

In another aspect, the present subject matter is directed to an agricultural steering system. The agricultural steering system includes an agricultural work vehicle having a first ground engaging element that is steerable and sized to traverse a field surface adjacent a first row of crops, as well as a first steering actuator coupled to the first ground engaging element and configured to change a steer angle of the first ground engaging element. The agricultural steering system also a first crop row sensor affixed to the agricultural work vehicle in proximity to the first ground engaging element and configured to generate first crop plant data indicative of a location of each crop plant of a plurality of first crop plants. A mitigation steering controller can also be provided and configured to selectively change the steer angle of the first ground engaging element of the agricultural work vehicle to avoid the first row of crops. The mitigation steering controller can be inhibited from changing the steer angle of the first ground engaging element when the first ground engaging element is in proximity to the first row of crops based on an evaluation of the first crop plant data.

In a further aspect, the present subject matter is directed to a method for mitigating damage to a row crop from an agricultural work vehicle having a ground engaging element sized to traverse a field surface adjacent a row of crops. The method includes sensing a location of the row of crops to generate crop plant data indicative of a location of each crop plant of a plurality of crop plants. The method also includes determining, based on an evaluation of the crop plant data, that the ground engaging element is not in proximity to the row of crops. The method further includes that upon determining that the ground engaging element is not in proximity to the row of crops, inhibiting the ground engaging element from being steered by an actuator configured to adjust a steer angle of the ground engaging element.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
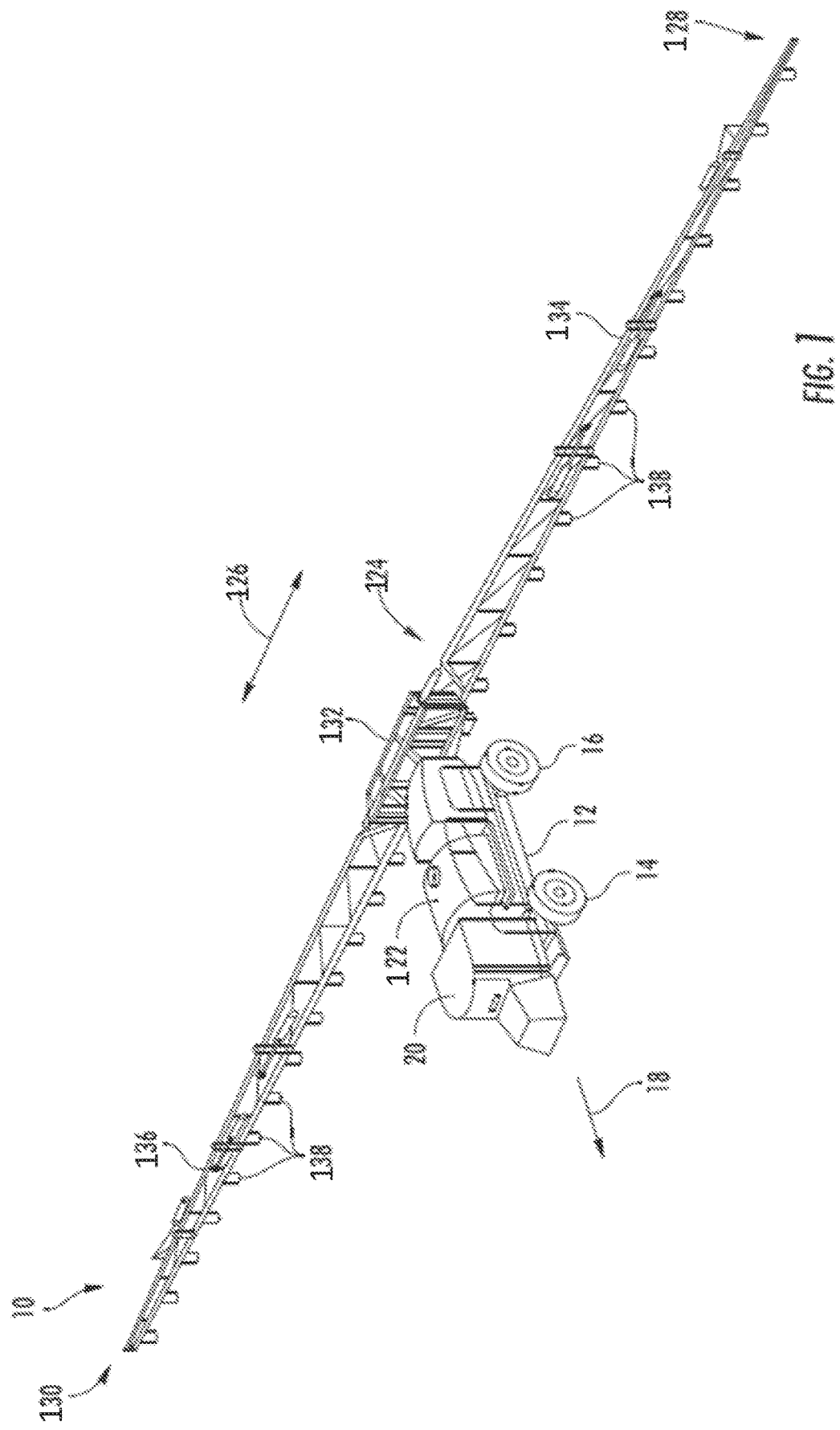
FIG. 1 illustrates a perspective view of one embodiment of an agricultural work vehicle (e.g., a sprayer) in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for mitigating damage to a row crop by changing a steer angle of a wheel of an agricultural work vehicle to avoid running into and/or over one or more crop plants of the row crop. Although the discussion herein will refer to a 'wheel' for convenience of discussion, any other ground engaging element, such as a steerable track of a tracked agricultural work vehicle, are also contemplated herein. Use of the term 'wheel,' therefore, will also be understood as referring to steerable operation of any type of ground engaging element such as a tire based wheel or steerable track. A crop row sensor can be used with the work vehicle to generate crop plant data which is indicative of a location of a crop plant. When the location of a crop plant has been detected in proximity to the wheel of the work vehicle, a mitigation steering controller can be used to command a change in steer angle of the wheel. The mitigation steering controller can be used to augment a default steering condition of the wheel that the mitigation steering controller is controlling. For example, if the wheel to which the mitigation steering controller is a rear wheel that is integrated with front wheels in a four-wheel-steering (4WS) configuration such that the rear wheels are slaved to the front wheels, the mitigation steering controller can change a steer angle of the rear wheel independent of the front wheels during an operation in a row of crop plants, but be inhibited from changing a steer angle of the rear wheel during an operation in which the rear wheels are not in a row of crop plants so that the rear wheels default back to the 4WS configuration. Any type of default steering operation is contemplated, whether 4WS, 2WS, etc.

In accordance with aspects of the present subject matter, the mitigation steering controller may include the ability to selectively change the steer angle of the wheel of the agricultural work vehicle. The mitigation steering controller can include an active state in which the mitigation steering controller is configured to generate a mitigation steer angle command to change the steer angle of the wheel, wherein the active state is determined based on an evaluation of the crop plant indicating that the wheel is in proximity to the row of crops. The mitigation steering controller includes an inactive state in which the mitigation steering controller does not change a steer angle of the wheel. The inactive state can be determined based on an evaluation of the crop plant data indicating that the wheel is no longer in proximity to a row of crops. Such a determination based on the crop plant data can be made on the basis of an expected spacing between adjacent crop plants of the row of crops. In some applications, the spacing between crop plants can be set by an operator to account for different row crops (e.g., seed corn may have a different spacing than soy beans). Furthermore, the spacing between adjacent crop plants in a row of crop plants may be different from the spacing between neighboring rows of crop plants. Upon traversing a row of crop plants the mitigation steering controller may detect a regular spacing between plants which is indicative of being in proximity to a row of crop plants, but when the row ends, such as ending at the edge of a turn row or headlands, the spacing between a next crop plant encountered by motion of the work vehicle may correspond to the spacing between adjacent rows which is indicative of no longer being in proximity to the row of crop plants. Thus, the mitigation steering controller can detect the end of a row of crop plants and the entry into another region, such as entry into a turn row or headlands.

Referring now to the drawings, FIG. 1 illustrates a perspective view of one embodiment of a work vehicle 10 in the form of an agricultural work vehicle 10. In the illustrated embodiment, the work vehicle 10 is configured as a self-propelled sprayer. However, in alternative embodiments, the work vehicle 10 may be configured as any other suitable agricultural vehicle that dispenses an agricultural fluid (e.g., a pesticide or a nutrient) while traveling across a field, such as an agricultural tractor and an associated implement (e.g., an inter-seeder, a side-dresser, and/or the like), or any other suitable agricultural work vehicle.

As shown in FIG. 1, the work vehicle 10 includes a frame or chassis 12 configured to support or couple to a plurality of components. For example, a pair of front wheels 14 and a pair of rear wheels 16 may be coupled to the frame 12. The wheels 14, 16 may be configured to support the work vehicle 10 relative to the ground and move the work vehicle 10 in a direction of travel (indicated by arrow 18) across the field. Furthermore, the frame 12 may support a cab 20 and an agricultural fluid tank 122 configured to store or hold an agricultural fluid, such as a pesticide (e.g., a herbicide, an insecticide, a rodenticide, and/or the like), a fertilizer, or a nutrient. However, in alternative embodiments, the work vehicle 10 may have any other suitable configuration. For example, in one embodiment, the front wheels 14 of the work vehicle 10 may be driven in addition to or in lieu of the rear wheels 16.

Additionally, the work vehicle 10 may include a boom assembly 124 mounted on the frame 12. In general, the boom assembly 124 may extend in a lateral direction (indicated by arrow 126) between a first lateral end 128 and a second lateral end 130, with the lateral direction 126 being perpendicular to the direction of travel 18. In one embodiment, the boom assembly 124 may include a center section 132 and a pair of wing sections 134, 136. As shown in FIG. 1, a first wing section 134 extends outwardly in the lateral direction 126 from the center section 132 to the first lateral end 128. Similarly, a second wing section 136 extends outwardly in the lateral direction 126 from the center section 132 to the second lateral end 130. Furthermore, a plurality of nozzles 138 (also referred to as spray tips) may be supported on the boom assembly 124. Each nozzle 138 may, in turn, be configured to dispense the agricultural fluid stored in the tank 122 onto the underlying field. However, in alternative embodiments, the boom assembly 124 may have any other suitable configuration.

Figure 2:
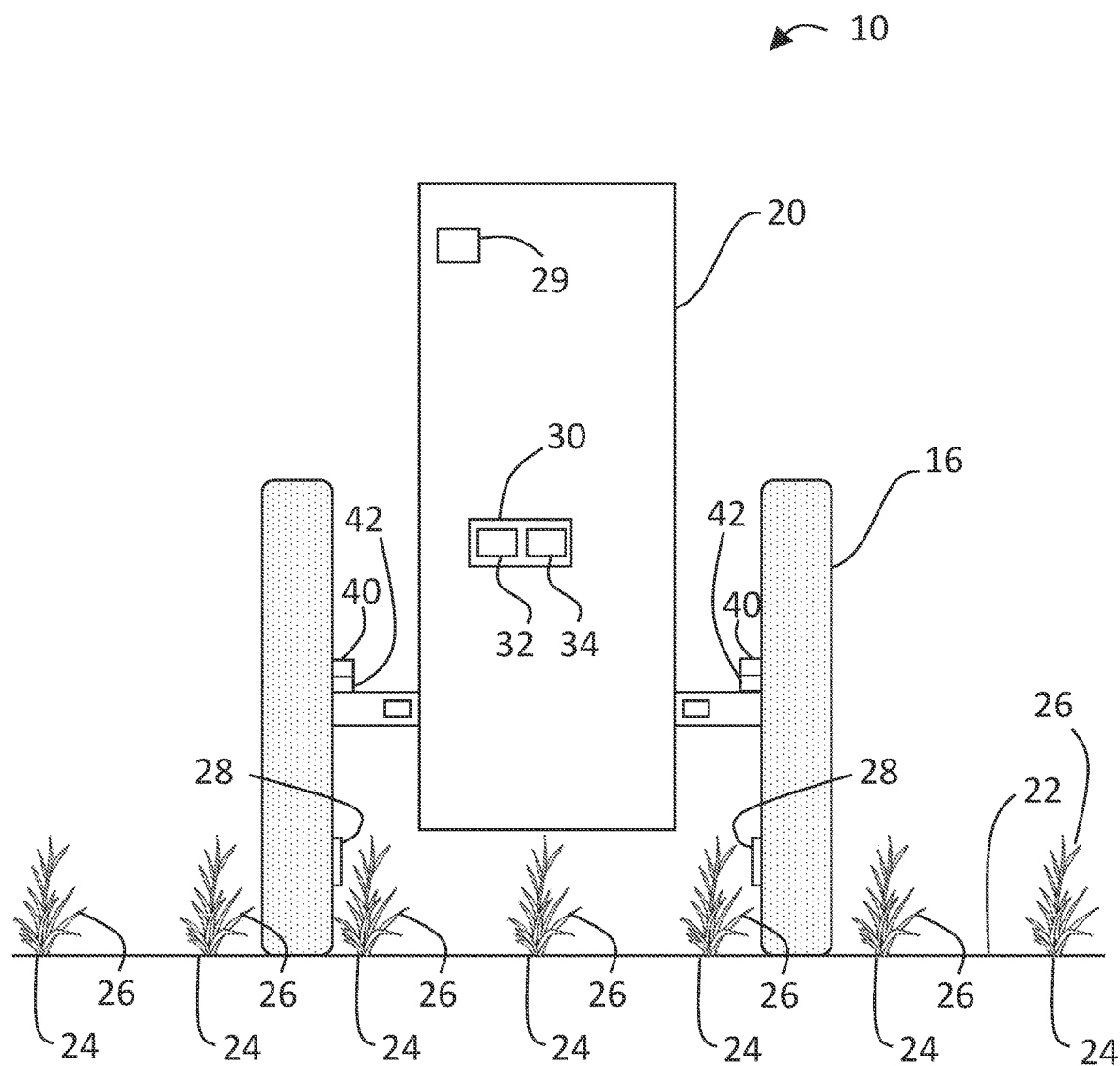
FIG. 2 illustrates a schematic view of one embodiment of an agricultural work vehicle having a crop row sensor in accordance with aspects of the present subject matter.

Turning now to FIG. 2, a view of the work vehicle 10 is depicted having its rear wheels 16 rolling along a field surface 22 in between adjacent rows 24 of crop plants 26. Although the illustrated embodiment is depicted relative to the rear wheels 16, it will be appreciated that the embodiments disclosed herein are also applicable to the front wheels 14. The work vehicle 10 includes a crop row sensor 28 on both rear wheels 16, but it will be appreciated that some embodiments may only include a crop row sensor 28 on one of the rear wheels 14. The crop row sensor 28 is configured to generate first crop plant data indicative of a location of each crop plant of a plurality of first crop plants. The location can include a position of the crop plant 26 relative to the wheel 16, or an absolute position of the crop plant 26 relative to a frame of reference. In some forms, tracking of crop plants 26 over time is also made possible from the crop plant data. The location of the crop plant 26 can thereafter be used to assist in changing a steer angle of the wheel 16 so that the work vehicle 10 does not track in or onto the crop plant 26. It will also be appreciated that the crop row sensor 28 itself, or the crop plant data generated by the crop row sensor 28 (e.g., either directly from the crop plant data, or indirectly through calibration, computation, etc.), can differentiate between crop plants 26 and other plants not related to crop plants 26, such as, but not limited to, weeds.

The crop row sensor 28 can take any variety of forms useful to generate data related to the position of crop plants. The crop row sensor 28 is structured to capture an image scene and then to generate crop plant data representing the image scene, which includes the location of a crop plant 26 in the image scene. The crop row sensor 28 can transmit data in any usable form. For example, in one form the crop row sensor 28 can transmit the raw data of scene information as sensed in the sensor. In another form, the crop row sensor 28 can include a transmission that includes calculated data related to the raw data. In yet another form, the crop row sensor 28 can also include in the transmission a representation of the data, whether calculated or raw, residing in a computing device associated with the crop row sensor 28. Data from the crop row sensor 28 can also be transmitted from a device, such as the data hub, that receives the data from the sensor 28.

In one embodiment, the crop row sensor 28 can take the form of a camera, where such camera can be of the 2-D or 3-D type. The camera can capture images in a variety of wavelengths, including visible wavelengths, near infrared, and infrared. The cameras can also capture images at a variety of resolutions. In some forms, the cameras can capture still images while in others the cameras can capture moving images at a variety of frame rates. In short, the camera can take on a variety of forms. The camera can be calibrated such that a location of the crop plants 26 can be determined, such as the position of the crop plant 26 relative to the wheel 16. In addition, such calibration can provide for the determination of distance between the crop plants 26 captured by the camera-based crop row sensor 28.

In another embodiment, the crop row sensor 28 can take the form of a light detection and ranging (LiDAR) system capable of generating crop plant data in the form of point cloud data useful in providing ranging or distance information to the crop plants 26. The LiDAR can have any variety of resolution, frame rates, and viewing angles. It will be appreciated that the point cloud information can be communicated to other devices (e.g., to the data hub and/or to a controller configured to operate upon the crop plant data) whereupon further computations can be performed, or information related to the point cloud can be operated upon further by the LiDAR system. The data from the LiDAR system can be communicated through any suitable techniques, including wired or wireless communication. Based on the point cloud data generated by a LiDAR-based crop row sensor 28, location information of the crop plant 26 can also be determined.

Similar to image data collected from a camera-based crop row sensor 28, data collected from the LiDAR system can be further processed by detecting objects in the point cloud data. Further, object detection techniques as applied to point cloud data can also include an identification within the point cloud data of the crop plant 26, and a confidence of detection. As with the camera-based crop row sensor 28 above, an output of the object detection using information collected from the LiDAR object detection sensor can include a detection data signal reflective of an identification of the crop plant 26 within the image scene captured by the LiDAR sensor, and a location of the crop plant 26. The detection data signal, as will be appreciated in the discussion above, can be determined in the LiDAR object detection sensor or another device using the scene signal provided by the crop row sensor 28.

In yet another embodiment, the crop row sensor 28 can take the form of radar capable of detecting radar objects and tracking the crop plants 26 through time. Any given embodiment of the radar is structured to provide any number of functions and measures, including tracking of crop plants 26, position of the crop plants in a radar frame of reference, Doppler speed, and a confidence of identification/confidence of detection of the crop plants 26. The crop plant data from the radar can be communicated through any suitable technique, including wired or wireless communication to any other device (e.g., the data hub and/or suitable controller that operates upon the crop plant data). As with the camera-based crop row sensor 28 above, an output of the from the radar-based crop row sensor 28 can include a detection data signal reflective of a position of the crop plant 26 within the image scene captured by the radar sensor, and/or a detection confidence of the crop plant. The crop plant data, as will be appreciated in the discussion above, can be determined in the radar-based crop row sensor 28 or another device using information in the image scene captured by the radar-based crop row sensor 28.

In yet another embodiment, the object detection sensor can take the form of an ultrasonic sensor (or, in some forms, an array of ultrasonic sensors). The ultrasonic sensor can be used as a ranging device to a crop plant 26 in proximity to the crop row sensor 28. In one form, crop plant data collected from an ultrasonic-based crop row sensor 28 can also be used, for example, as a counter in which time different measurements between counts can be correlated to distance between crop plants 26 when factoring in the speed of the work vehicle 10.

The work vehicle 10 can include a vehicle navigation system 29 capable of determining position and/or velocity of the work vehicle 10. Such a vehicle navigation system 29 can include a receiver configured to receive a satellite navigation signal(s) from a global navigation satellite system (GNSS) such as, but not limited to, signals from the Global Position System (GPS), Galileo, Glonass, and BeiDou. The navigation system 29 can additionally and/or alternatively include an inertial system to complement or add to the position data from the GNSS. In sum, the vehicle navigation system 29 can produce data indicative of one or more of position and velocity (or alternatively, speed).

The work vehicle 10 also includes a vehicle controller 30 having one or both of a mitigation steering controller 32 and a mitigation tread width controller 34. The vehicle controller 30 can take a variety of forms depending on the application, such as a full vehicle controller capable of automatic steering operations of the work vehicle. In other forms, however, the full vehicle controller 30 may only be supervisory in nature. In one form, the vehicle controller 30 may have a default mode of operation in which the controller aids in controlling the speed of the work vehicle and/or steer angle of one or more wheels irrespective of the mitigation steering controller 32 and the mitigation tread width controller 34. Thus, embodiments herein contemplate the vehicle controller 30 switching between a default mode (e.g., which can be among a plurality of default modes) and one or more of the mitigation steering controller 32 and the mitigation tread width controller 34.

Figure 3:
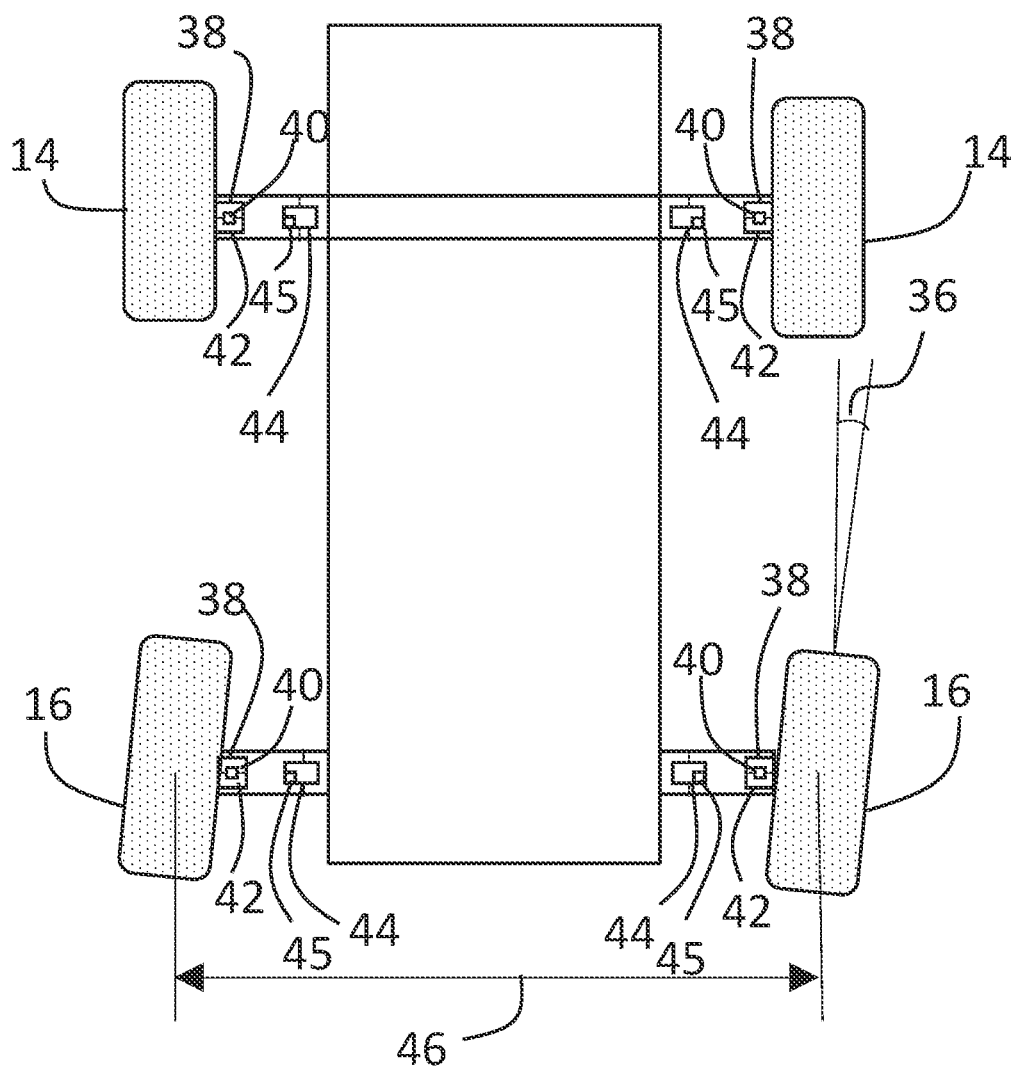
FIG. 3 illustrates a schematic view of one embodiment of an agricultural work vehicle with a wheel having a steer angle in accordance with aspects of the present subject matter.

Turning now to FIGS. 2 and 3, the mitigation steering controller 32 operates by sensing a steer angle 36 using a steer angle sensor 38 configured to generate steering data indicative of a steer angle of one of the front wheels 14 and back wheels 16. Although the illustrated embodiment depicts steer angle sensors 38 associated with each of front wheels 14 and rear wheels 16, it will be appreciated that other embodiments include fewer steer angle sensors 38 (e.g., some embodiments may include only one or both of the steer angle sensors 38 for the rear wheels 16). The steer angle sensor 38 can take the form of any variety of sensors useful to generate steering data, including linear and rotary sensors whose output is indicative, either directly or indirectly (e.g., through calibration, computation, etc.), of the steer angle 36 of a wheel. In the illustrated embodiment, the steer angle sensors 38 are coupled with a kingpin 40 about which respective wheels 14 and 16 are rotated for steering. The steer angle sensors 38 can be configured to measure the kingpin angle associated with a steer angle.

A steering actuator 42 is provided to change the steer angle 36 of a wheel to which the steering actuator 42 is operatively coupled. Though each of the front wheels 14 and rear wheels 16 are depicted as including both steer angle sensor 38 and steering actuators 42, it will be appreciated that not all embodiments need include such equipment on each of the wheels 14 and 16. For example, in some embodiments of the work vehicle 10, only one steer angle sensor 38 and steering actuator 42 need be included.

The mitigation steering controller 32 is configured to selectively change the steer angle of any of the wheels 14 and 16 which can be controlled via the steering actuator 42. The mitigation steering controller 32 can generate a mitigation steer angle command to change the steer angle 36 of one or more of the wheels 14 and/or 16 based at least in part on a distance between an associated wheel 14/16 and one or more of the crop plants 26. For example, the mitigation steering controller 32 can steer an associated wheel 14/16 away from the one or more crop plants 26 if the distance fails to satisfy a threshold distance. Continuing with this example, if a distance between a particular wheel of wheels 14/16 and a crop plant 26 is below a minimum threshold (as assessed at least in part based upon the crop plant data generated from the crop row sensor 28 associated with that particular wheel), the mitigation steering controller 32 can command the steering actuator 42 to change the steer angle 36 associated with that particular wheel to drive away from the crop plant 26. Likewise, if a distance between a particular wheel of wheels 14/16 and a crop plant 26 is above a maximum threshold (as assessed at least in part based upon the crop plant data generated from the crop row sensor 28 associated with that particular wheel), the mitigation steering controller 32 can command the steering actuator 42 to change the steer angle 36 associated with that particular wheel to drive toward the crop plant 26.

It will be appreciated that the mitigation steering controller 32 may be capable of changing the steer angle 36 at any time during operation of the work vehicle 10, but it may also be capable of being placed in a state in which no active control of the steering actuator 42 is possible. For example, and as will be described further below, in some embodiments the mitigation steering controller 32 may have an active mode and an inactive mode, either determined internally to the mitigation steering controller 32 or determined externally, such as, but not limited to, being determined by the vehicle controller 30.

A tread width actuator 44 is provided to change a tread width 46 between opposing wheels (either wheels 14 or 16, but in the illustrated embodiment it is depicted as rear wheels 16) to which the tread width actuator 44 is operatively coupled. Though each of the front wheels 14 and rear wheels 16 are depicted as being associated with the tread width actuator 44, it will be appreciated that not all embodiments need include such equipment on each of the wheels 14 and 16. For example, in some embodiments of the work vehicle 10, only one tread width actuator 44 need be included on either of the front wheels 14 and/or on either of the rear wheels 16. The tread width 46 can be changed, based upon force applied from the tread width actuator 44, through a telescoping mechanism that extends or retracts one or more of the wheels 14/16 relative to the cab 20.

The mitigation tread width controller 34 is configured to selectively change the tread width 46 of any pair of opposing wheels 14 and 16 having at least one associated tread width actuator 44, where the tread width can be changed via the steering actuator 42. The mitigation tread width controller 34 can generate a tread width command to change the tread width 46 of one or more of the wheels 14 and/or 16 based on either, or both, of a distance between rows 24 of crop plants 26, or a steer angle 36 of one or more of the wheels 14/16. In some forms, the vehicle controller 30 may set the tread width 46 based on the distance between rows 24 of the crop plants 26. In one non-limiting example, mitigation tread width controller 34 can generate a mitigation tread width command to change the tread width 46 of either or both of the opposing wheels 14/16 to grow or shrink based on the steer angle 36 of at least one wheel of an associated set of opposing wheels 14/16. To use the rear wheels as a particular example, the mitigation tread width controller 34 can generate a mitigation tread width command to change the tread width 46 of the opposing wheels 16, and achieve a change in tread width via one or both of the tread width actuators 44, to grow the tread width 46 as the steer angle increases. Such an increase in steer angle may be the result of the work vehicle 10 nearing the end of a row 24 of crop plants 26, and the work vehicle 10 beginning a turn into the turn row/headland before the rear wheels 16 have exited the row. If a sharp turn is made before the rear wheels 16 exit the row; the steer angle 36 may be relatively high on the rear wheels 16 as they track down a row 24 of crop plants 26, which may result in the rear wheels 16 running into or over one or more crop plants 26 of the row 24 unless the tread width 46 is increased. Such an increase in tread width 46 may be needed until the rear wheels 16 exit the row 24 of crop plants 26. Likewise, if a shallow turn is made before the rear wheels 16 exit the row; and the steer angle 36 may be relatively low on the rear wheels 16 as they track down a row 24 of crop plants 26, but the rear wheels 16 may nevertheless still run into or over one or more crop plants 26 of the row 24 unless the tread width 46 is changed. Such an increase in tread width 46 may be needed until the rear wheels 16 exit the row 24 of crop plants 26, whether the turn at the end of a row 24 is sharp or shallow:

The tread width actuator 44 can be calibrated to provide a given tread width 46 for any given command, but in some embodiments, a tread width sensor 45 can be used to provide tread width data indicative of the tread width 46. Such a sensor can taken any variety of forms, including a linear transducer. In those embodiments in which the tread width actuator 44 is either not calibrated to provide a tread width 46, or does not perform loop closure at the tread width actuator 44, then the tread width data can be communicated back to the mitigation tread width controller 34 to perform loop closure so that the resultant tread width 46 is changed appropriate to the tread width command from the mitigation tread width controller 34.

In some embodiments, only a single steer angle sensor 38 associated with one wheel (e.g., one of the rear wheels 16) may be used with the mitigation tread width controller 34. In other embodiments, however, steer angle sensors 38 associated with both opposing wheels (e.g., both opposing wheels 16) can be used. In such embodiments, it is contemplated that one steer angle sensor 38 is used as primary sensor while the other steer angle sensor 38 is designated as backup. It is also contemplated that steering data from each of the steer angle sensors 38 can be merged, such as through averaging, to obtain a merged value from which the mitigation tread width controller 34 can determine the mitigation tread width command. Use of a merged value of steering data (e.g., an average) can alleviate short term steer angle 36 changes owing to regulating the distance between a wheel 14/16 and a crop plant 26 that may only represent a short term change in steer angle 36 but not yet a change in tread width 46 (e.g., the work vehicle 10 may not have begun, or may only just begun, a turn into the turn row or headlands). The use of a merged value may also alleviate spurious data drop outs or other noise which may lead to erroneous determination of a mitigation tread width command. Filtering can also be used on the steering data, either on its own or when steering data is merged between steer angle sensors 38.

As will be appreciated, operation of the mitigation steering controller 32 and the mitigation tread width controller 34 can occur independent of each other, or in combination. Some forms of the work vehicle 10 may include only one of the mitigation steering controller 32 and the mitigation tread width controller 34. In other embodiments of the work vehicle 10, both of the mitigation steering controller 32 and the mitigation tread width controller 34 may be present in the vehicle controller 30. In still further forms in which both the mitigation steering controller 32 and the mitigation tread width controller 34 are present in a work vehicle 10, an operator may chose to engage only one. But of course, both of the mitigation steering controller 32 and the mitigation tread width controller 34 can be operated in parallel. For example, the mitigation steering controller 32 can be used to ensure proper spacing between a wheel and a row 24 of crop plants 26, while the mitigation tread width controller 34 ensures that the steer angle 36 is taken into account to adjust the tread width 46.

Figure 4:
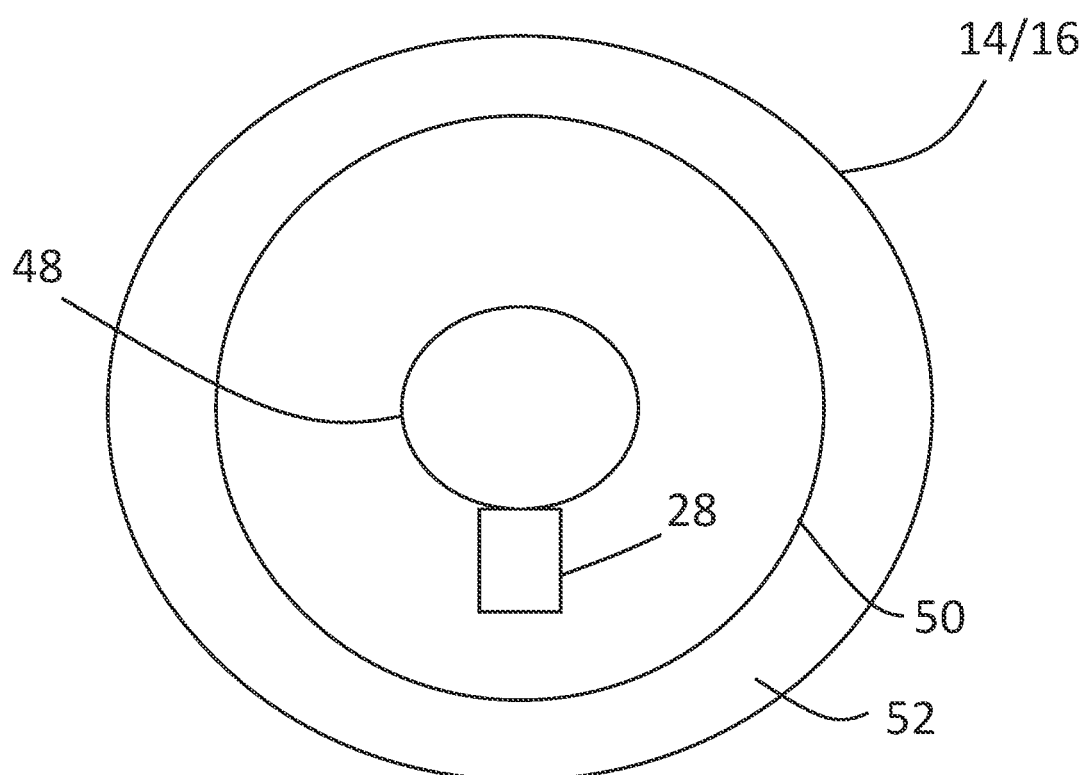
FIG. 4 illustrates a schematic view of one embodiment of a wheel having a hub and crop row sensor in accordance with aspect of the present subject matter.

Turning now to FIG. 4, one embodiment of a wheel (depicted as either front wheel 14 or rear wheel 16) is shown that illustrates an exemplary relative location for the crop row sensor 28. As suggested in FIG. 2, the crop row sensor 28 can be mounted at a relatively low position to aid in sensing its surroundings and generating the crop plant data. As depicted in FIG. 4, the crop row sensor 28 is located below a hub 48 of the wheel and above a bead 50 of a tire 52 associated with the wheel. In some forms, the crop row sensor 28 is attached to the hub 48 at that location, but other suspension components of the work vehicle 10 are also contemplated. Although the crop row sensor 28 is illustrated as attached at that location in FIG. 4, it can be attached elsewhere in other embodiments. Furthermore, although the position of the crop row sensor 28 in FIG. 2 illustrates a field of view inward, in some forms, a crop row sensor 28 may be mounted and oriented to provide different vantages. For example, in some forms, the crop row sensor 28 may be mounted to look downward from above the crop plant 26.

Figure 5:
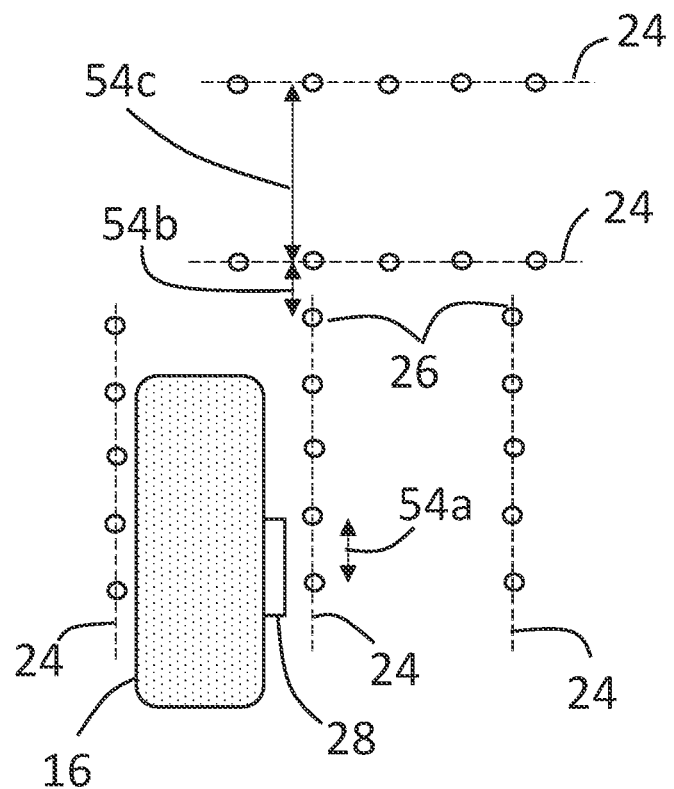
FIG. 5 illustrates a schematic view of one embodiment of a wheel of a work vehicle in proximity to a row of crop plants in accordance with aspects of the present subject matter.
Figure 6:
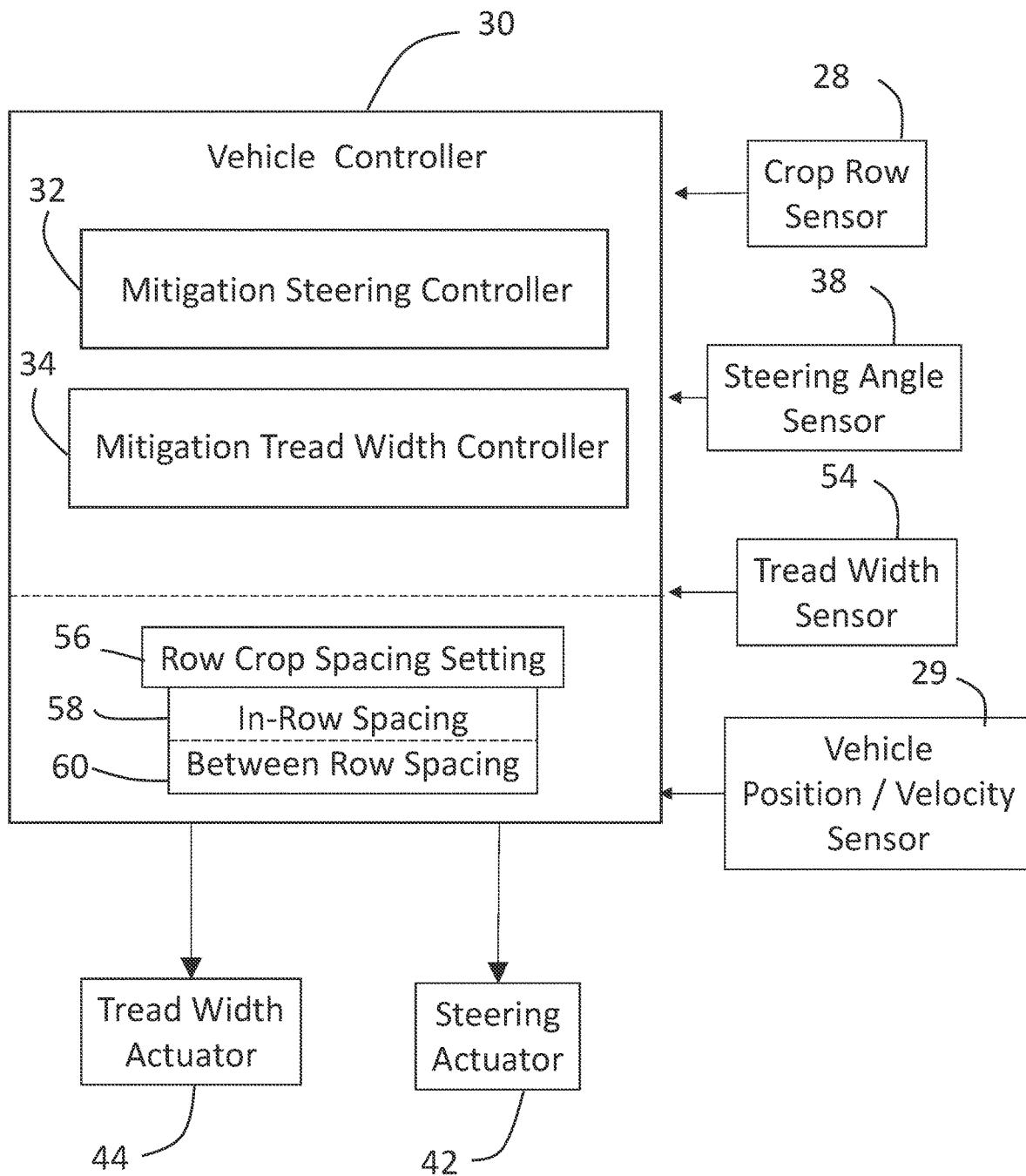
FIG. 6 illustrates a schematic view of one embodiment of a vehicle controller in communication with sensors and actuators in accordance with aspects of the present subject matter.

FIGS. 5 and 6 illustrates an operation of the work vehicle 10 when a wheel (illustrated as wheel 16 for ease of reference, but no limitation is intended regarding the applicability of wheel 14) is travelling along a row 24 of crop plants 26. The crop row sensor 28 can detect a presence of the crop plant 26 and generate crop plant data, where the crop plant data either directly indicates a spacing 54$a$ between crop plants 26 in the row 24, or the crop plant data indirectly indicates a spacing 54$a$ (e.g., such as through calculations on the crop plant data in post processing). As the work vehicle 10 traverses further along the row 24, crop plant data generated by the crop row sensor 28 can indicate additional spacings 54$b$ and 54$c$ between crop plants 26 that the work vehicle 10 encounters. The spacing 54$a$, as illustrated, represents a spacing between crop plants 26 that belong to a common row 24. An evaluation of the crop plant data that yields a spacing 54$a$ indicates that the ground engaging element is in proximity to the row 24 of crop plants. Spacing 54$b$, on the other hand, represents a spacing between a crop plant 26 in one row 24 relative to a crop plant 26 in another row 24, where the two rows 24 are transverse to each other. Such a spacing 54$b$ can indicate the intersection between the long rows 24 of a field and the turn row/headland rows. An evaluation of the crop plant data that yields a spacing 54$b$ indicates that the ground engaging element is no longer in proximity to the row 24 of crop plants. The spacing 54$c$ represents a spacing between adjacent rows 24 of crop plants 26. An evaluation of the crop plant data that yields a spacing 54$c$ indicates that the ground engaging element is no longer in proximity to the row 24 of crop plants. An evaluation of the crop plant data that yields no longer provides a spacing, such as can result from a complete exit from a field of crop plants, also indicates that the ground engaging element is no longer in proximity to the row 24 of crop plants. The spacing 54a between crop plants 26 belonging to a common row 24 can be referred to as 'in-row spacing,' while the spacing 54c between adjacent rows 24 of crop plants can be referred to as 'between row spacing.'

In some embodiments, the vehicle controller 30 and/or either or both of the mitigation steering controller 32 and mitigation tread width controller 34 can include a row crop spacing setting 56 reflective of the type of crop plant 26 that the work vehicle 10 is conducting an operation. If the row crop is seed corn, the row crop spacing setting 56 may be different than if the row crop is soy beans. The row crop spacing setting 56 can be selected by an operator of the work vehicle 10, or it can be automatically set by the vehicle controller 30 when the crop row sensor 28 detects a crop plant 26. In some forms, the row crop spacing setting 56 is a selection of pre-determined settings (e.g., selecting between 'corn' and 'soybean,' where the vehicle controller 30 includes numerical numbers associated with each), while in other forms, the row crop spacing settings 56 can be entered as a number by an operator or automatically set. The row crop spacing settings 56 can include an in-row spacing setting 58 and a between row spacing setting 60.

During operation, the vehicle controller 30 and/or either or both of the mitigation steering controller 32 and mitigation tread width controller 34 can compare a spacing between crop plants 26 with the row crop spacing settings 56 to aid in determining the type of location of the wheel 16, such as whether it is traversing along a row 24, or is transitioning from a long row 24 to a turn row/headland row 24, or has completed a transition. For example, when any given spacing determined from the crop plant data equals the in-row spacing setting 58 (e.g., spacing 54a equals the in-row spacing setting 58), it is determined that the wheel 16 is traversing along row. When any given spacing determined from the crop plant data equals the between row spacing setting 60 (e.g., spacing 54c satisfies the between row spacing setting 58), it is determined that the wheel 16 is entering or has entered the turn row 24/headland rows 24. When comparing any given spacing to the row crop spacing settings 56, a threshold can be applied to the comparison to determine whether the setting is satisfied. For example, a threshold of +/−10% on a numerical value associated with the in-row spacing can be applied to any given spacing determined from the crop plant data. If the threshold is satisfied (e.g., within and including any limits), then it is determined that the spacing satisfies the particular setting.

Figure 7:
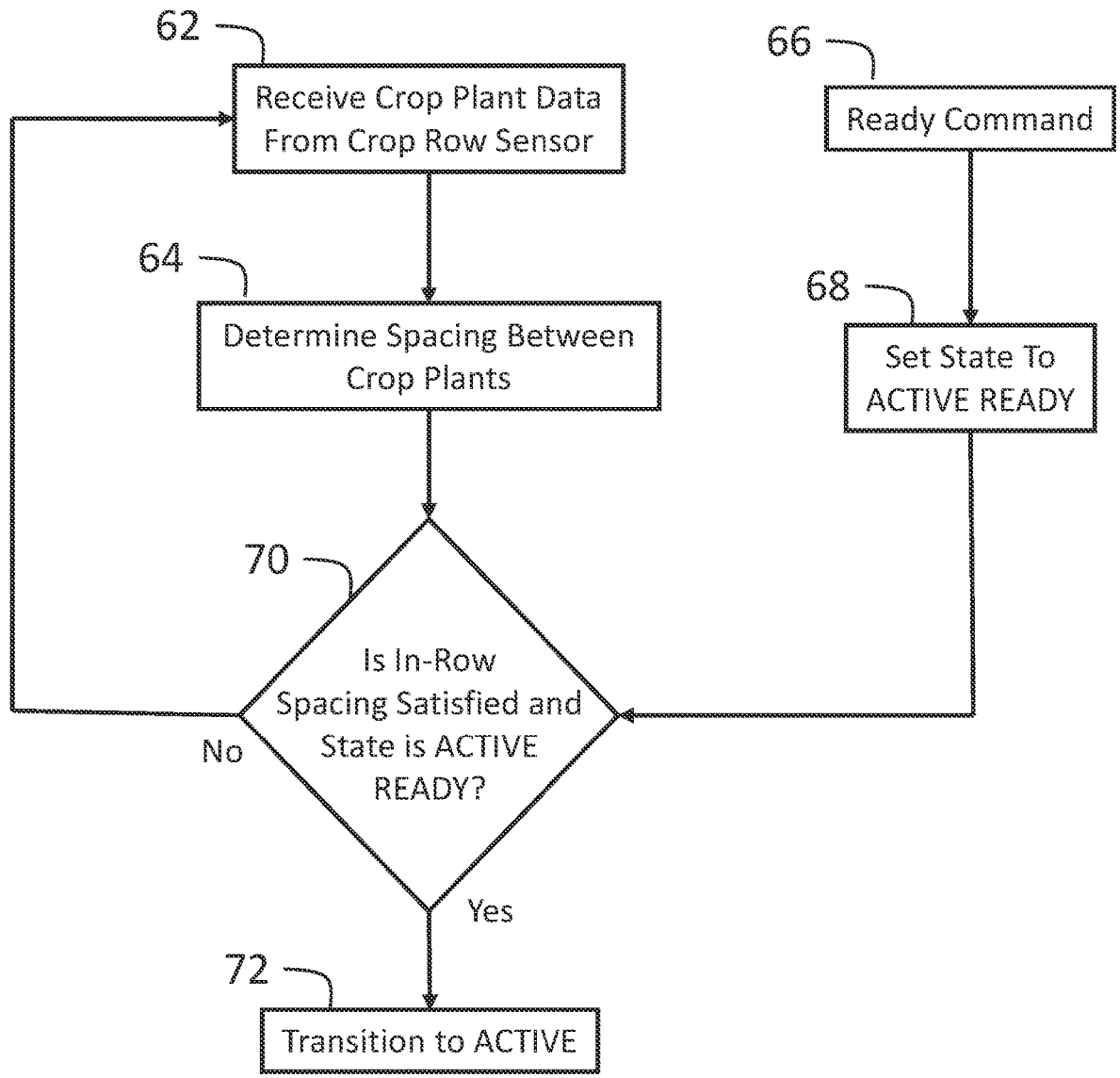
FIG. 7 illustrates a flow diagram of one embodiment of a method for transitioning either of a mitigation steering controller or a mitigation tread width controller to an ACTIVE state in accordance with aspects of the present subject matter.

Turning now to FIG. 7, one embodiment of operation of either or both of the mitigation steering controller 32 and mitigation tread width controller 34 is illustrated. The discussion below in FIG. 7 will use the vehicle controller 30 as the example controller that performs the various operations for ease of discussion, but no limitation is hereby intended that the actions described below with respect to FIG. 7 is limited in any way to just the vehicle controller 30. For example, although the mitigation tread width controller 34 is described in FIG. 7 as being in a pre-ACTIVE state until both conditions in block 70 are satisfied, no limitation is hereby intended that the vehicle controller 30 must perform supervisory duties and that the mitigation tread width controller 34 is not performing operations. In some forms, the mitigation tread width controller 34 (or for that matter, the mitigation steering controller 32) may perform the operations described in FIG. 7 but otherwise not issue any commands until in the ACTIVE state. In another example, receipt of crop plant data can be by any one of the vehicle controller 30, mitigation steering controller 32, and/or mitigation tread width controller 34. Thus, one or more of the operations described in FIGS. 7-9 could be performed by any one of the vehicle controller 30, mitigation steering controller 32, and/or the mitigation tread width controller 34.

The operation in FIG. 7 begins with the receipt, at block 62, of crop plant data by the vehicle controller 30 from the crop row sensor 28. A spacing between two or more crop plants 26 is determined in block 64 using the crop plant data. An operator of the work vehicle 10 can trigger the ACTIVE READY state of the mitigation controllers 32 and 34. Such a trigger can be by selection of a menu option or activation of a button, among other potential actions. In other forms, however, a trigger is not needed from an operator. For example, the vehicle controller can monitor navigation data from the vehicle navigation system 29 and, on the basis of the navigation data, satisfy the ready command at block 66. The ready command may be satisfied at block 66 if the work vehicle is determined to be tracking along a long row 24 of a field (e.g., a seed row) and is not in a turn row 24 or headland row 24. When the ready command is satisfied at block 66, the vehicle controller 30 can set the system to the ACTIVE READY state at block 68. The condition block 70 determines whether additional data will be received from the crop row sensor 28, or if the system is transitioned to the ACTIVE state. The condition block tests two conditions: (1) whether the in-row spacing setting 58 is satisfied, and if the system is in the ACTIVE READY state. If both conditions are satisfied, the system transitions to ACTIVE READY. If neither of the conditions are satisfied, the system returns to block 62 and block 66.

Figure 8:
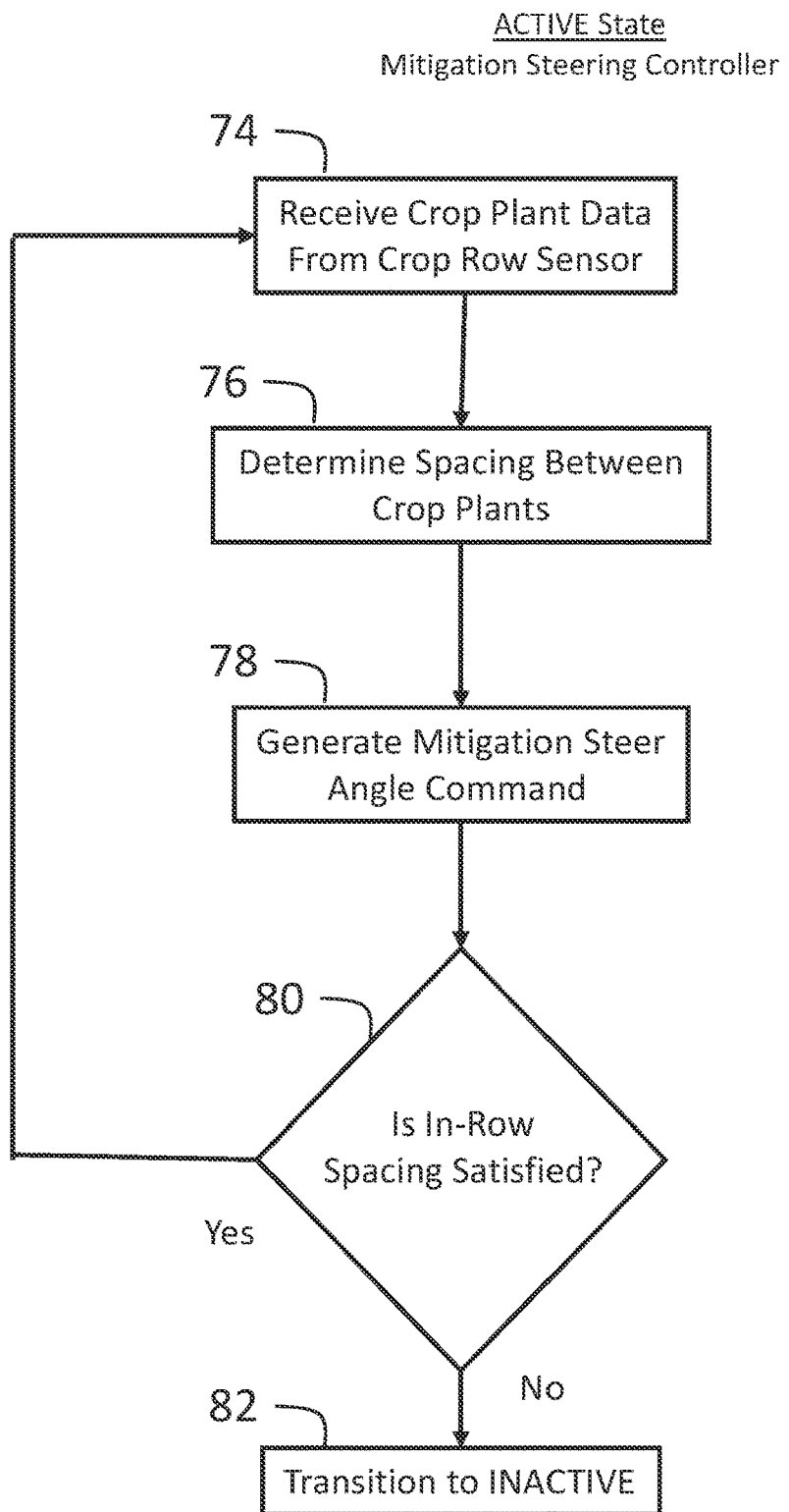
FIG. 8 illustrates a flow diagram of one embodiment of a method for transitioning a mitigation steering controller to an INACTIVE state in accordance with aspects of the present subject matter.

FIG. 8 is a depiction specifically related to the mitigation steering controller 32. The operation in FIG. 8 begins by receiving crop plant data from the crop row sensor 28 at block 74, and determining a spacing 54 between crop plants at block 76. Upon determining the spacing 54, the mitigation steering controller 32 can generate a mitigation steer angle command at block 76. As will be appreciated in the discussion above, the mitigation steer angle command generated at step 76 is used by the steering actuator 42 to change a steer angle 36 of one or more of the wheels 14/16. Condition block 80 determines whether the spacing between crop plants satisfies the in-row spacing 58. If the in-row spacing is satisfied, additional crop row sensor data is received at block 74 and the process repeats. If, however, the in-row spacing 58 is not satisfied, the condition block 80 proceeds to block 82 where the mitigation steering controller 32 is transitioned to the INACTIVE state. The INACTIVE state is characterized such that the steering actuator 42 no longer responds to commands, if any, issued by the mitigation steering controller 32. In some embodiments, the entire mitigation steering controller 32 can be deactivated, but in some forms, the mitigation steering controller 32 may still compute a mitigation steer angle command but not send such a command to the steering actuator 42. The process of FIG. 8 thus inhibits the mitigation steering controller 32 from changing the steer angle 36 via a mitigation steer angle command once it is determined that the work vehicle 10 no longer has a wheel 14 and/or 16 adjacent to a row 24 of crop plants 26. The use of the steering actuator 42 is returned to a default state and is not controlled by the mitigation steering controller 32 when a wheel (or wheels) is no longer adjacent to a row that corresponds to the in-row spacing 58.

Figure 9:
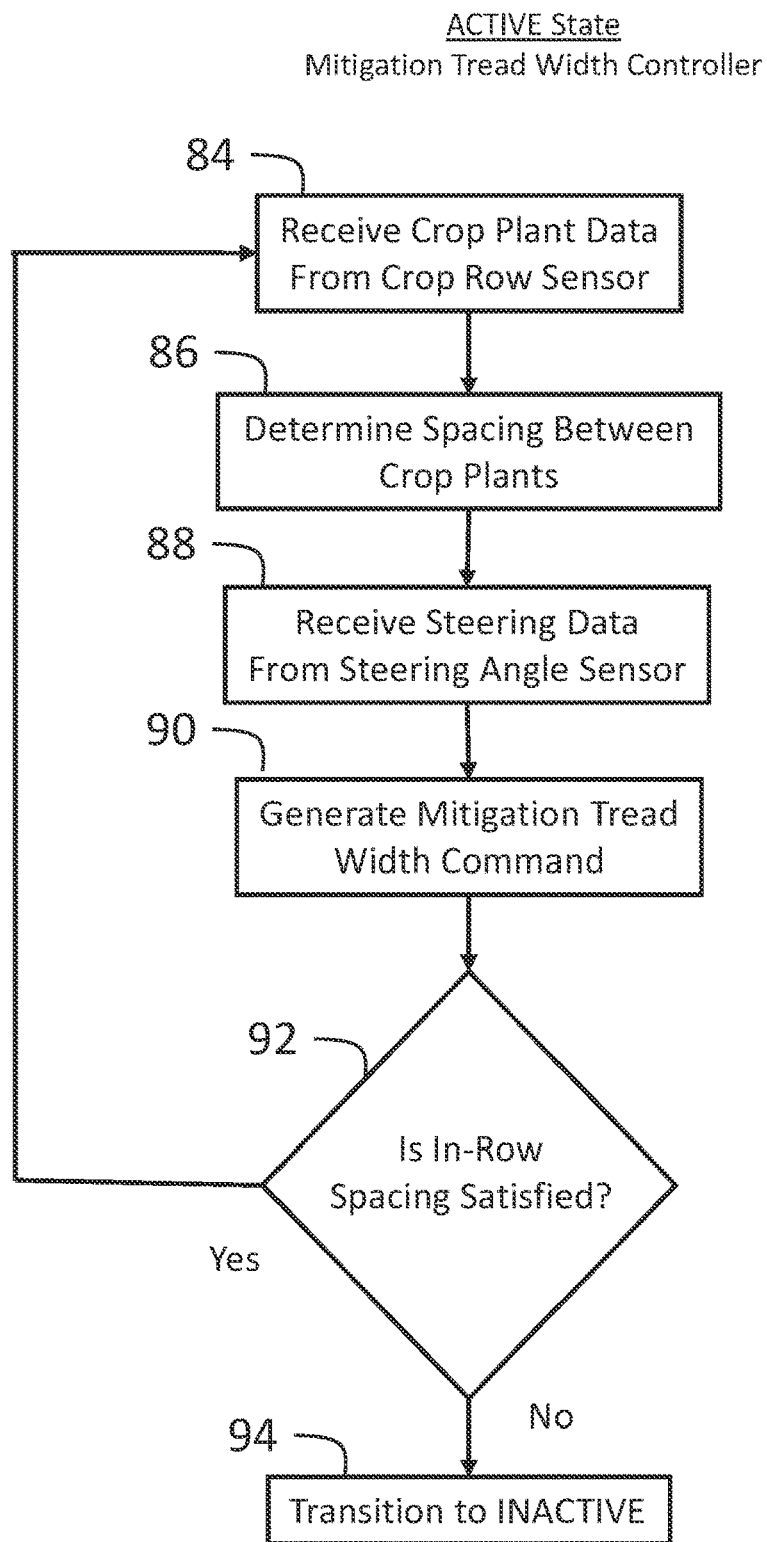
FIG. 9 illustrates a flow diagram of one embodiment of a method for transitioning a mitigation tread width controller to an INACTIVE state in accordance with aspects of the present subject matter.

FIG. 9 is a depiction specifically related to the mitigation tread width controller 34. The operation in FIG. 9 begins by receiving crop plant data from the crop row sensor 28 at block 84, and determining a spacing 54 between crop plants at block 86. The mitigation tread width controller 34 also receives steering data from the steer angle sensor 38 to aid in the determination of a tread width command. The mitigation tread width controller 34 generates a mitigation tread width command at block 90. As will be appreciated in the discussion above, the mitigation tread width command generated at step 90 is used by the tread width actuator 44 to change a tread width 46 of one or both opposing wheels 14/16. Condition block 92 determines whether the spacing between crop plants satisfies the in-row spacing 58. If the in-row spacing is satisfied, additional crop row sensor data is received at block 84 and the process repeats. If, however, the in-row spacing 58 is not satisfied, the condition block 92 proceeds to block 94 where the mitigation tread width controller 34 is transitioned to the INACTIVE state. The INACTIVE state is characterized such that the tread width actuator 44 no longer responds to commands, if any, issued by the mitigation tread width controller 34. In some embodiments, the entire mitigation tread width controller 34 can be deactivated, but in some forms, the mitigation tread width controller 34 may still compute a mitigation tread width command but not send such a command to the tread width actuator 44. The process of FIG. 9 thus inhibits the mitigation tread width controller 32 from changing the tread width 46 via a mitigation tread width command once it is determined that the work vehicle 10 no longer has a wheel 14 and/or 16 adjacent to a row 24 of crop plants 26. The use of the tread width actuator 44 is returned to a default state and is not controlled by the mitigation steering controller 32 when a wheel (or wheels) is no longer adjacent to a row that corresponds to the in-row spacing 58.

Figure 10:
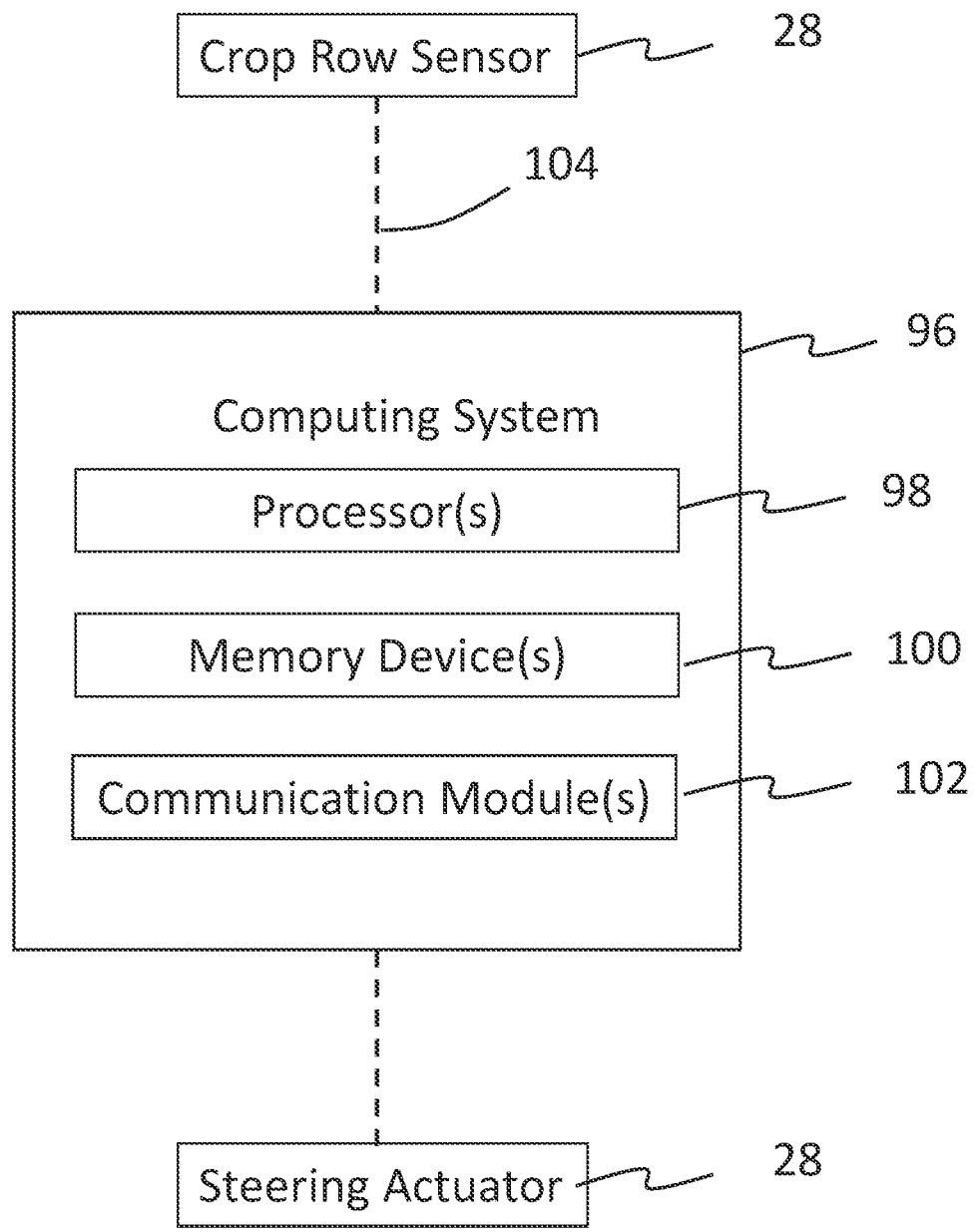
FIG. 10 illustrates a schematic view of one embodiment of a computing system for communicating with a sensor in accordance with aspects of the present subject matter.

Referring now to FIG. 10, embodiments of the systems and methods disclosed herein may include a computing system 96 communicatively coupled to one or more of the sensors 28, 29, 38, and 54, shown as sensor 28 in FIG. 10 for ease of illustration, as well as one or more of actuators 42 and 44. The computing system 96 depicted in FIG. 10 can be the vehicle controller 30, mitigation steering controller 32, and/or mitigation tread width controller 34 described and depicted above. Thus, any reference herein with respect to the computing system 96 can apply to any of vehicle controller 30, mitigation steering controller 32, and mitigation tread width controller 34. The illustrated embodiment depicted in FIG. 10 makes reference to the crop row sensor 28 and steering actuator 42, but no limitation is intended as these are illustrated for purposes of an example.

In general, the computing system 96 may include suitable algorithms, mathematical formulas or expressions, predetermination relationships, correlation tables, look-up tables, and/or other data stored within its memory that allows the computing system 96 to determine, calculate, or estimate any data associated with determining a spacing 54 between crop plants 26.

In general, the computing system 96 may comprise any suitable processor-based device known in the art, such as a computing device or any suitable combination of computing devices. Thus, in several embodiments, the computing system 96 may include one or more processor(s) 98 and associated memory device(s) 100 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 100 of the computing system 96 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 100 may generally be configured to store suitable computer-readable instructions that, when implemented by the processor(s) 98, configure the computing system 96 to perform various computer-implemented functions, such as one or more aspects of the methods or algorithms described herein. In addition, the computing system 96 may also include various other suitable components, such as a communications circuit or module, one or more input/output channels, a data/control bus and/or the like. For instance, the computing system 96 may include a communications module or interface 102 to allow the computing system 96 to communicate with any of the various other system components described herein, such as the sensor(s) 38, 39, and 45. Specifically, as shown schematically in FIG. 10, the communications module 102 may be communicatively coupled to the sensor 28 via one or more communicative links 104 to allow data to be transmitted from the sensor 28 to the computing system 96.

It should be appreciated that, in several embodiments, the computing system 96 may correspond to a stand-alone computing system separate and apart from other computing systems. Additionally, in some embodiments, the computing system 96 may correspond to or form part of an existing on-board computing system.

Figure 11:
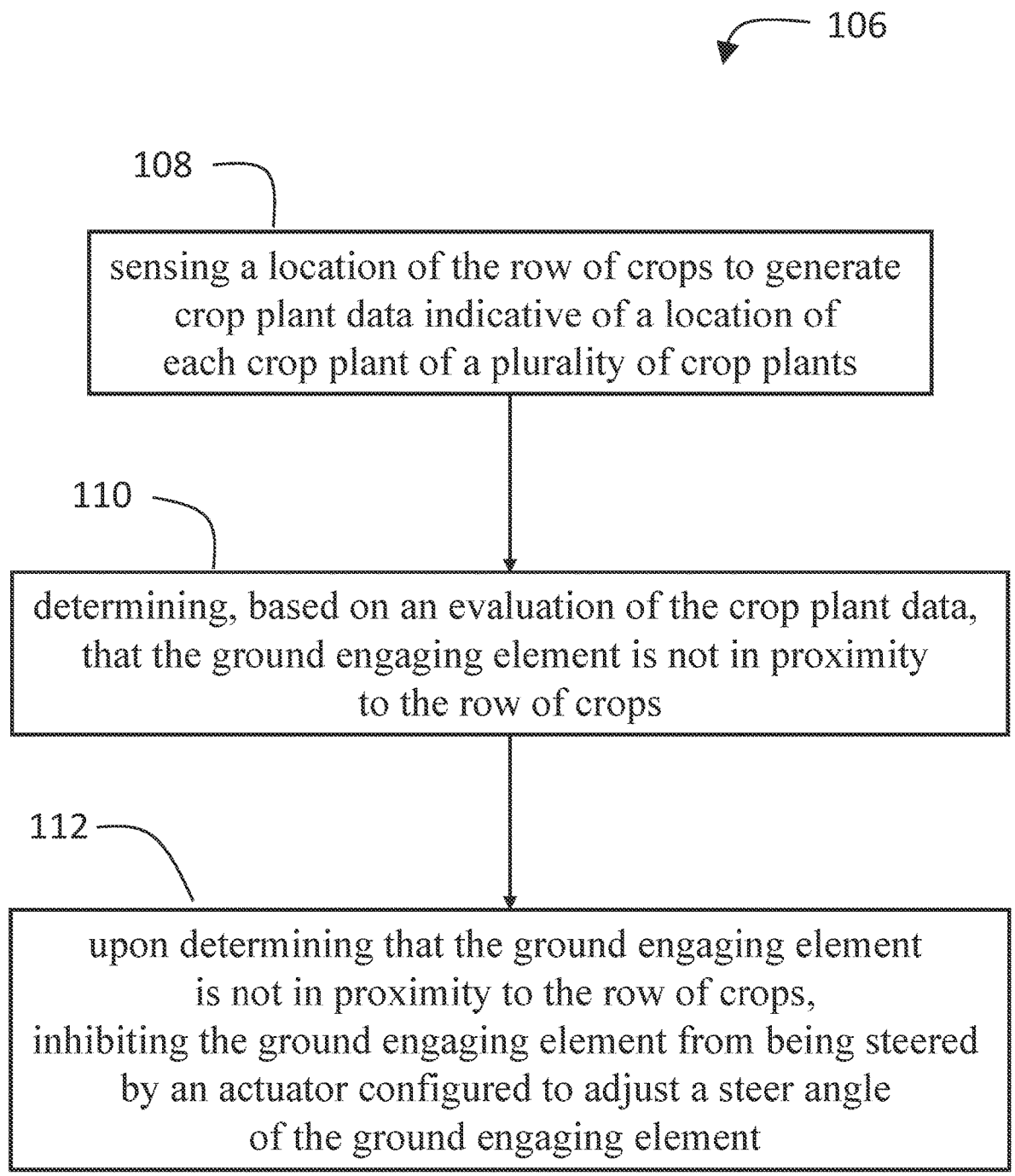
FIG. 11 illustrates a flow diagram of one embodiment of a method for mitigating damage to a row crop from an agricultural work vehicle having a wheel sized to traverse a field surface adjacent a first row of crop in accordance with aspects of the present subject matter.

Turning now to FIG. 11, a flow diagram of one embodiment of a method 106 is provided for mitigating damage to a row crop from an agricultural work vehicle having a ground engaging element sized to traverse a field surface adjacent a row of crops. In general, the method 106 will be described herein with reference to the agricultural work vehicle 10 described and depicted in FIGS. 1-3. However, it should be appreciated by those of ordinary skill in the art that the disclosed method 106 may generally be implemented with any agricultural work vehicle 10 having any suitable configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at step 108, the method 106 may include sensing a location of the row of crops to generate crop plant data indicative of a location of each crop plant of a plurality of crop plants. At step 110, the method may further include determining, based on an evaluation of the crop plant data, that the ground engaging element is not in proximity to the row of crops. At step 112, the method may further include upon determining that the ground engaging element is not in proximity to the row of crops, inhibiting the ground engaging element from being steered by an actuator configured to adjust a steer angle of the ground engaging element. It is to be understood that the steps of the method 106 are performed by the computing system 96 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 96 described herein, such as the method 106, is implemented in software code or instructions which are tangibly stored on a tangible computer readable medium. The computing system 96 loads the software code or instructions via a direct interface with the computer readable medium or via a wired and/or wireless network. Upon loading and executing such software code or instructions by the computing system 96, the computing system 96 may perform any of the functionality of the computing system 96 described herein, including any steps of the method 106 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for steering agricultural work vehicles, the system comprising:
    a row crop mitigation system configured to mitigate damage to a row crop by changing a steer angle of a ground engaging element of an agricultural work vehicle, the row crop mitigation system having:
        a crop row sensor configured to generate crop plant data indicative of a location of each crop plant of a plurality of crop plants, the crop plant data including in-row spacing data indicative of an in-row spacing between adjacent crop plants of a common row of crop plants; and
        a mitigation steering controller configured to selectively change the steer angle of the ground engaging element of the agricultural work vehicle, the mitigation steering controller having an inactive state in which the mitigation steering controller does not change a steer angle of the ground engaging element and an active state in which the mitigation steering controller is configured to generate a mitigation steer angle command to change the steer angle of the ground engaging element,
    wherein the active and inactive states are determined based on at least in part on a comparison of the in-row spacing to an in-row spacing threshold,
    wherein the mitigation steering controller is maintained in the active state when the in-row spacing satisfies the in-row spacing threshold
    wherein the mitigation steering controller transitions from the active state to the inactive state when it is determined that the in-row spacing no longer satisfies the in-row spacing threshold.

2. The system for steering of claim 1, wherein the mitigation steering controller is configured to determine a distance between at least one crop plant and the ground engaging element based on the crop plant data, and wherein the mitigation steer angle command is determined based on the distance.

3. The system for steering of claim 1, wherein the in-row spacing threshold is a configurable setting in the mitigation steering controller.

4. The system for steering of claim 1, which further includes the agricultural work vehicle having the row crop mitigation system.

5. The system for steering of claim 4, wherein the ground engaging element is a rear ground engaging element of the agricultural work vehicle, and wherein the mitigation steer angle command is independent of a steer angle command to change a steer angle of a front ground engaging element of the agricultural work vehicle.

6. The system for steering of claim 5, wherein the agricultural work vehicle includes a vehicle controller, wherein the vehicle controller includes the mitigation steering controller, wherein the steer angle of the rear ground engaging element is changed by the vehicle controller during the inactive state of the mitigation steering controller.

7. An agricultural steering system comprising:
    an agricultural work vehicle having a first ground engaging element and a second ground engaging element opposite the first ground engaging element, the first ground engaging element being steerable and sized to traverse a field surface adjacent a first row of crops, the second ground engaging element being steerable and sized to traverse a field surface adjacent a second row of crops;
    a first steering actuator coupled to the first ground engaging element and configured to change a steer angle of the first ground engaging element;
    a second steering actuator coupled to the second ground engaging element and configured to change a steer angle of the second ground engaging element;
    a first crop row sensor affixed to the agricultural work vehicle in proximity to the first ground engaging element and configured to generate first crop plant data indicative of a location of each crop plant of a plurality of first crop plants;
    a second crop row sensor affixed to the agricultural work vehicle in proximity to the second ground engaging element and configured to generate second crop plant data indicative of a location of each of crop plant of a plurality of second crop plants; and
    a mitigation steering controller configured to selectively change the steer angle of the first ground engaging element and the second ground engaging element of the agricultural work vehicle to avoid the first row of crops and the second row of crops, respectively, the mitigation steering controller inhibited from changing the steer angle of the first ground engaging element when the first ground engaging element is not in proximity to the first row of crops based on an evaluation of the first crop plant data, the mitigation steering controller inhibited from changing the steer angle of the second ground engaging element when the second ground engaging element is not in proximity to the second row of crops based on an evaluation of the second crop plant data, wherein the inhibition of the mitigation steering controller of changing the steer angle of the first ground engaging element occurs independent of the inhibition of the mitigation steering controller of changing the steer angle of the second ground engaging element.

8. The agricultural steering system of claim 7, wherein the first crop row sensor is positioned below a hub of the first ground engaging element.

9. The agricultural steering system of claim 8, wherein first the crop row sensor is positioned above a bead of a tire of the first ground engaging element.

10. The agricultural steering system of claim 7, wherein the first ground engaging element is a rear ground engaging element, and wherein the first crop row sensor is directed to view inward toward the second rear ground engaging element of the agricultural work vehicle.

11. The agricultural steering system of claim 7, wherein the first crop row sensor is one of an ultrasonic sensor, radar, camera, or LiDAR.

12. The agricultural steering system of claim 7, which further includes a vehicle controller having the mitigation steering controller, the vehicle controller configured to change the steer angle of the first ground engaging element when the mitigation steering controller is inhibited from changing the steer angle of the first ground engaging element.

13. A method for mitigating damage to a row crop from an agricultural work vehicle having a ground engaging element sized to traverse a field surface adjacent a row of crops, the method comprising:
    sensing a location of the row of crops to generate crop plant data indicative of a location of each crop plant of a plurality of crop plants, the crop plant data including in-row spacing data indicative of an in-row spacing between adjacent crop plants of a common row of crop plants;
    determining, based on an evaluation of the crop plant data, that the in-row spacing no longer satisfies an in-row spacing threshold; and
    upon determining that the in-row spacing no longer satisfies an in-row spacing threshold, inhibiting the ground engaging element from being steered by an actuator configured to adjust a steer angle of the ground engaging element.

* * * * *